United States Patent Office 3,376,743
Patented Apr. 9, 1968

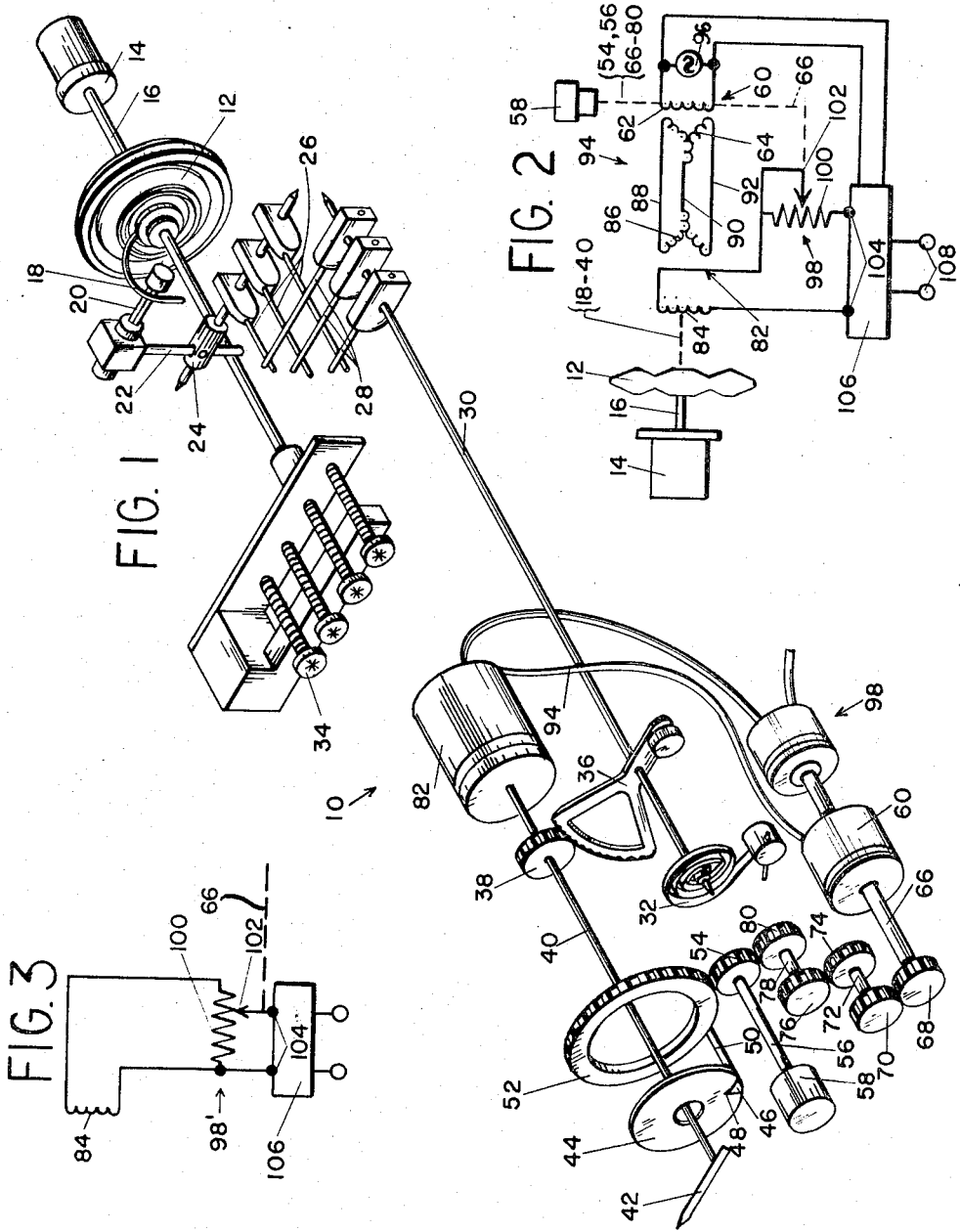

3,376,743
LINEARIZED ELECTRICAL OUTPUT FROM PRESSURE ACTUATED AIRSPEED INSTRUMENT
Vincent P. Caggia, River Vale, N.J., assignor, by mesne assignments, to Lear Siegler, Inc., Santa Monica, Calif., a corporation of Delaware
Filed June 15, 1966, Ser. No. 557,734
9 Claims. (Cl. 73—182)

This invention relates to a pressure actuated airspeed instrument and especially to a pressure actuated airspeed instrument having means for connecting it to electrical control apparatus such as a flight controller or an autopilot or the like.

Pressure actuated airspeed instruments are well known in the art. Such instruments normally include a pitot tube, an expandable capsule connected to the pitot tube, a rotatable pointer, linkage and gear means for connecting the expandable capsule to the pointer for rotating the pointer in accordance with expansion and contraction of the capsule, and an indicia plate calibrated so that the pointer points to the appropriate airspeed mark at any given airspeed. It is also well known to associate with the indicia plate a movable pointer which may point at a given airspeed mark to call the pilot's attention to that speed. Such a preselected airspeed may be the speed at which the aircraft is to cruise or it may be a critical speed at which the aircraft should not cruise. In any event the means are often included in such instruments for manually adjusting the marker by rotating the knob associated with the instrument.

It is well known that aircraft instruments for indicating airspeed do not have linear dials but, instead, have logarithmic dials due to the fact that the capsule does not expand and contract linearly as airspeed rises and decreases.

In the present invention it is desired to provide an electrical output which is dependent upon the angular difference between the indicating pointer position and the set pointer position. However, such an angular difference represents a varying error signal due to the non-linearity of the instrument. Accordingly, in accordance with the present invention, it is desired that the electrical output be linear irrespective of the speed of the aircraft. This is the principal object of the present invention.

Another object of the present invention is to provide a simple and inexpensive electrical output means coupled to a pressure actuated airspeed instrument which yields a linear electrical output for a given error in speed irrespective of the speed of the aircraft.

The above and other objects, features and characteristics of the present invention will be more fully understood in accordance with the following description taken in connection with the accompanying illustrative drawings.

In the drawing,

FIG. 1 is an exploded perspective view of the airspeed instrument embodying the present invention;

FIG. 2 is a diagrammatic view showing the circuit means incorporated in the present invention; and FIG. 3 is a fragmentary diagrammatic view of the circuit means of FIG. 2 showing a modification of the present invention.

Referring now to the drawing in detail, the airspeed instrument is generally designated by the reference numeral 10. It will be understood in this connection that the instrument can be incorporated in a more complex instrument such as, for example, a combined airspeed and mach indicator without departing from the invention. However, for simplicity of presentation, I have chosen to describe the invention in connection with an airspeed indicator, without any intention of limiting the scope of the protection granted herein.

The airspeed instrument 10 includes an airspeed capsule 12 which is connnected to a pitot pressure source 14 by a pipe or conduit 16. As the capsule 12 expands and contracts, a U-shaped output member 18 moves back and forth in the direction of the longitudinal axis of the instrument 10. The member 18 is in engagement with an arm 20 which extends outwardly from a rod 22 fixed to a rotatable shaft 24, which is journaled in end bearings that are not shown. Accordingly, as the member 18 moves back and forth, the shaft 24 will rock about its axis. Extending radially from the shaft 24 are one or more levers 26 which are in cooperative engagement with one or more levers 28 that are secured to a rotatable shaft 30. The shaft 30 is rotatably journaled in end bearings (not shown) and is biased by a spring 32 in a counter-clockwise direction to hold the levers 28 in engagement with the levers 26 and to bias the shaft 24 in a counter-clockwise direction whereby to bias the arm 20 into continuous operative engagement with the member 18. The interconnecting levers 26 and 28 form no part of the present invention per se and any other form of interconnecting linkage may be employed in the present invention. The specific nature of the inter-connecting linkage 26 and 28 is fully described and claimed in U.S. Patent 3,257,845 granted on June 28, 1966 to John H. Andresen, Jr. and Emil P. Knapp and assigned to the assignee hereof. It will also be noted that preferably associated with the capsule 12 is a calibrating means 34 which forms no part of the present invention and which may be deleted if desired. However, if a full explanation of the calibrating means 34 is desired, reference may be had to the aforementioned Patent No. 3,257,845. Fixed to shaft 30 is a gear segment 36 which is in meshed relation with a gear 38 mounted on shaft 40 to which an airspeed pointer 42 is also secured. The airspeed pointer is disposed in operative relation with an indicia bearing plate 44 that carries airspeed indicia thereon. It will be obvious that as the airspeed of the aircraft varies, the pressure in capsule 12 will vary to cause an expansion and contraction of the capsule 12 which expansion and contraction will cause in turn a movement of member 18 which movement will cause a rocking movement of the shaft 24 and through the levers 26–28, there will be a rocking movement of the shaft 30, which rocking movement will be translated by the gear 36 and the gear 38 into rotational movement of the shaft 40 and the airspeed pointer 42. As the airspeed pointer moves, it will point to different airspeed indicia on the indicia plate 44 whereby to indicate a changed airspeed.

Also associated with the indicia plate 44 is a set point pointer 46 that has a pointed end 48 in a plane parallel to and in front of the indicia plate 44 and has a portion extending parallel to the longitudinal axis of the instrument 10 which portion is designated by the reference numeral 50 and which portion is fixed to a ring gear 52 that surrounds the shaft 40 and is free to rotate relative thereto. The ring gear 52 is in meshed relation with a gear 54 mounted on a rotatable shaft 56 that carries at its other end a manually grippable knob 58. When the knob 58 is turned, the shaft 56 and the gear 54 will turn therewith whereby to impart a rotation to the ring gear 52 and to set point pointer 46 to shift the relative position between the pointer end 48 and the indicia plate 44 to set a new set point with respect to the airspeed indicia.

All that has been described above is well known in the art and may be reviewed in greater detail in said aforementioned Andresen and Knapp Patent No. 3,257,845. In accordance with the present invention it is desired to obtain an electrical output proportional to the angular difference between the set point pointer 48 and the airspeed pointer 42 and which will produce a linear signal irrespective of the location of the set point pointer. Such a linear signal has many uses in an aircraft. For example, the linear signal can be put into an autopilot to automatically adjust the speed of aircraft and thereby restore it to the set point speed when an error occurs, or the signal can be put into an integrated flight controller or the like.

To obtain such a signal it is herein proposed to provide two synchro means, one in which the rotor is moved in accordance with the position of the airspeed pointer 42 and the other of which the rotor is moved in accordance with the position of the set point pointer 46, and with the stators of the two synchro means connected back-to-back so that the output signal of the rotor moving in cooperation with the airspeed pointer will be proportional to the angular difference between the set point pointer and the airspeed pointer or its analog, the angular difference between the two rotors. While such an output signal is proportional to angular spacing, that angle in a non-linear system such as an airspeed system, represents a different amonut of error in knots at different angular positions around the dial 44. To obtain the same error signal for the same amount of error in knots, means must be interposed in the output circuit to linearize the output.

Therefore, further in accordance with the present invention, a linearizing means is interposed in the output circuit of the rotor that is coupled to the airspeed capsule which linearizing means is adjusted by the means for adjusting the position of the set point pointer in order to correct for the angular location of the set point pointer and thereby yield a linearized output.

The above described linearized electrical output means are shown in perspective in FIG. 1 and schematically in FIG. 2 and reference should be had to both drawings in connection with the following description. A first synchro 60 having a single phase rotor 62 and a three-phase connected stator 64 is provided to indicate the position of the set pointer. This indication is achieved by connecting the rotor 62 to a shaft 66 which carries a gear 68 which meshes with a gear 70 on a shaft 72. Shaft 72 carries a second gear 74 in meshed relation with a gear 76 on a shaft 78. The shaft 78 carries a second gear 80 which is in meshed relation with the gear 54 that drives the ring gear 52 to adjust the position of the set point pointer 46. Accordingly, movement of the gear 54 by the turning of the knob 58 will not only rotatably shift the ring gear 52 and the set point pointer 46, but through the gear train 68 to 80 inclusive will rotate the rotor 62 of synchro 60 an angular distance proportional to the location of the set point pointer 46. It will be obvious that other mechanical connecting means may be employed to move the rotor 62 in accordance with the movement of set point pointer 46.

A second synchro means 82 is provided to yield a signal proportional to the position of the airspeed pointer 42. The second synchro means 82 has a single phase rotor 84 which is coupled directly to the shaft 40 on which the airspeed pointer is mounted. The three-phase connected stator of the synchro means 82 is preferably connected in a Y-Y relationship to the stator 64 of synchro means 60 by three wires 88, 90 and 92 in a cable 94. If desired, a Δ-Δ connection or a Y-Δ connection or a Δ-Y connection may be employed. A predetermined input voltage from a suitable AC source 96 is applied to the rotor 62 of the synchro 60. With the circuit so arranged, if the angular relationship between the rotor 84 and the stator 86 is 90° from the angular relationship between the rotor 62 and the stator 64, the voltage appearing across the output terminals of the rotor 84 will be a null. However if there is an angular displacement between the two rotors from the 90° relationship, which angular displacement will result from an angular displacement between the two pointers 46 and 42, error voltage will appear across the output terminals of the rotor 84, which error voltage will persist until the rotor 84 has been moved into the 90° relative position with respect to its stator as the rotor 62 is with respect to its stator.

As already described, I have chosen to employ two synchro means 60 and 82 to generate the basic error signal to be linearized by the linearizing means to be described hereinafter. However, it is to be understood that the term synchro means as used herein includes not only synchros but modified form of synchros such as syntrols. As a matter of fact, I presently prefer that the synchro means 82 be a syntrol due to the greatly reduced mass of the rotor on such a device which reduction in mass will reduce any interference with the operation of the pressure actuated airspeed pointer 42.

Depending upon the location of the set point pointer 46, a measured angular difference from the 90° relationship between the two rotors, which measured difference will yield the same voltage at the terminals of the rotor 84 irrespective of the position of the set point pointer, will represent a different error in knots between the desired speed as set by the set point pointer 46 an dthe measured speed as read by the airspeed pointer 42. In order to obain a voltage that is linear with respect to the error in knots and not the error in degrees of angular displacement a linearizing means 98 is interposed in the output circuit of the rotor 84 to compensate for the non-linearity of the system. As shown in FIG. 2 the linearizing means 98 is a potentiometer that is connected as a variable resistor. Specifically, the linearizing means 98 includes a resistive element 100 whose resistance per inch along the length thereof varies from one end to the other in accordance with the non-linearity of the system. If the movable element or slide 102 is moved in accordance with movement of the set point pointer 46, the variation in resistance of the output circuit from the rotor 84 can be effected to provide a linearized output at the output terminals 104 of the output circuit of the rotor 84. If desired, and as shown in FIG. 2, the output terminals 104 may be connected to a demodulator 106 which compares the error signal with the standard signal supplied by the AC source 96 and demodulates or rectifies the resulting output signal and applies such rectified error output signal to its own output terminals 108. The output terminals 108, as previously suggested, may be connected to an autopilot or a flight controller or the like.

As noted above, the slide 102 of the potentiometer 98 is driven by the knob 58 through an appropriate mechanical linkage. The slide 102 is preferably mounted directly on the synchro shaft 66 and extends radially therefrom to engage the variable resistor 100 which is preferably wound about a toroidal core. While this is a simple and direct means to move the slide 102 in accordance with movement of the set point pointer 46, it will be obvious that other mechanical connections may be employed to effect such concomitant and interrelated movement.

It will also be recognized that the linearizing means need not be in the form of a variable resistor. For example, the linearizing means 98 could be connected as a voltage divider and it would still work in a most satisfactory manner. Preferably, as with the variable resistor connection, the resistive element itself is such to yield a different resistance per unit length along its length to compensate for the non-linearity of the system. This is illustrated in FIG. 3. Further, the linearizing means 98 need not accomplish its result through the variation of resistance of voltage along a resistive element 100. Such variation can be accomplished by varying reactance rather than resistance. In any event it is important that the slide or varying means 102 be driven concomitantly with the rotor which establishes the reference. In the particular instance illustrated is the rotor 62. However, from a theoretical viewpoint the reference voltage could be applied to the rotor 84 and the error voltage be derived from the output voltage of the rotor 62 in which case the rotor 84 and/or the capsule 12 would be required, through appropriate gearing or linkage, to drive the slide 102. However, such an arrangement, while theoretically possible, is not as desirable as the illustrated arrangement due to the limited amount of force available from the capsule 12 to drive the slide 102. It is for this reason that it is preferred to drive the slide from the manually driven knob 58 and to provide the signal from which the error signal is derived from the rotor 84 connected to the capsule 12. Further, the mechanical arrangement as shown in FIG. 2, with the slide 102 connected to rotor 62, can be employed with the electric system modified to connect the reference voltage 96 to rotor 84, and to connect rotor 62 to the linearizing device 98. Similarly, the electrical arrangement of FIG. 2 could be maintained while the mechanical connections are modified to drive the slide 102 with the rotor 84. This, of course, would have the shortcoming of demanding undue torque output from capsule 12. Naturally, if some form of torque amplifying means were interposed, this shortcoming could be eliminated.

Another modification of the invention is to make the resistive element 100 of uniform resistance along its length and to move slide 102 at a non-linear rate dependent upon the position of the set point pointer 46. This could be employed in a circuit with a moving slide variable resistor or a moving slide potentiometer or the like. Various types of non-linear drives, such as cam drives, will readily suggest themselves to those skilled in the art.

While the above description has been directed to the use of synchro means for the detection of the positions for the airspeed pointer and the set pointer, other electrical-position transducing means having two relatively movable parts for generating a voltage in accordance with the relative positions there-between may be employed within the scope of the present invention. For example, rotary differential transformers, linear differential transformers, E-pickoffs, microsyns, induction potentiometers and other transducting means having relatively movable parts may be employed within the scope of the present invention.

While I have herein shown and described the preferred form of the present invention and have suggested modifications therein, other changes and modifications may be made therein within the scope of the appended claims without departing from the spirit and scope of this invention.

Having thus described the invention, what is desired to secure and claim by Letters Patent is:

1. An aircraft instrument comprising a pressure actuated means responsive to airspeed, airspeed indicator means, means for connecting said airspeed responsive means to said airspeed indicator means for driving the latter by the former, means for indicating a preselected airspeed, means for adjusting said last mentioned indicating means, a first electrical-position transducing means having a pair of relatively movable parts, means for connecting one of the parts of said first electrical-position transducing means to said adjusting means for positioning said one part in accordance with the adjustment of said adjusting means, a second electrical-position transducing means having a pair of relatively movable parts, means for connecting one of the parts of said second electrical-position transducing means to said airspeed responsive means for positioning said one part in accordance with airspeed, circuit means for connectng the other parts of said two electrical-position transducing means to one another, means for applying a predetermined voltage to said one part of one of said two electrical-position transducing means, voltage linearizing means including a movable member, means for connecting said movable member to the means for positioning said one part of one of said two electrical-position transducing means for moving said movable member in response to movement of said positioning means for said one part, and error signal circuit means including the said one part of the other of said two electrical-position transducing means and said linearizing means and having a pair of output terminals, the voltage across said output terminals being varied in accordance with the movement of said movable member.

2. The aircraft instrument of claim 1, wherein said electrical-position transducing means are both synchro means, and said one parts thereof are rotors and the other parts thereof are stators.

3. The aircraft instrument of claim 2, wherein said one of said two synchro means is said first synchro means and the other of said two synchro means is said second synchro means.

4. The aircraft instrument of claim 3, wherein said linearizing means is a variable resistor in which said movable member is a slide.

5. The aircraft instrument of claim 4, wherein said variable resistor has a variable resistance per unit length along its length in accordance with the non-linearity of movement of said airspeed indicator means and said slide moves linearly with respect to movement of said means for indicating a preselected airspeed.

6. The aircraft instrument of claim 5, a demodulator having output terminals, circuit means for supplying a predetermined voltage to said demodulator, means for connecting the output terminals of said error signal circuit means to said demodulator, said demodulator including means for comparing said error signal and said predetermined voltage and for applying to its output terminal a voltage dependent upon such comparison.

7. The aircraft instrument of claim 3, wherein said linearizing means is a voltage divider in which said movable member is a slide.

8. The aircraft instrument of claim 7, wherein said potentiometer includes a resistor having a variable resistance per unit length along its length in accordance with the non-linearity of movement of said airspeed indicator means and said slide moves linearly with respect to movement of said means for indicating a preselected airspeed.

9. The aircraft instrument of claim 8, a demodulator having output terminals, circuit means for supplying a predetermined voltage to said demodulator, means for connecting the output terminals of said error signal circuit means to said demodulator, said demodulator including means for comparing said error signal and said predetermined voltage and for applying to its output terminal a voltage dependent upon such comparison.

References Cited

UNITED STATES PATENTS

| | | | |
|---|---|---|---|
| 2,833,970 | 5/1958 | Cummings | 244—77 X |
| 2,948,406 | 8/1960 | Joline | 244—77 |
| 2,975,351 | 3/1961 | Wegley | 244—77 X |
| 3,171,616 | 3/1965 | Forsberg et al. | 244—77 |
| 3,257,845 | 6/1966 | Andresen et al. | 73—182 |

LOUIS R. PRINCE, *Primary Examiner.*

N. B. SIEGEL, *Assistant Examiner.*